(12) United States Patent
Tomita

(10) Patent No.: US 8,274,557 B2
(45) Date of Patent: Sep. 25, 2012

(54) IMAGE-DISPLAYING DEVICE, METHOD AND SYSTEM

(75) Inventor: Hideo Tomita, Kanagawa (JP)

(73) Assignee: Sony Corporation, Tokyo (JP)

( * ) Notice: Subject to any disclaimer, the term of this patent is extended or adjusted under 35 U.S.C. 154(b) by 493 days.

(21) Appl. No.: 12/619,733

(22) Filed: Nov. 17, 2009

(65) Prior Publication Data

US 2010/0123773 A1    May 20, 2010

(30) Foreign Application Priority Data

Nov. 18, 2008   (JP) ................. P2008-294233

(51) Int. Cl.
*H04N 13/04* (2006.01)
(52) U.S. Cl. ................. 348/54; 348/42; 348/51
(58) Field of Classification Search .............. None
See application file for complete search history.

(56) References Cited

U.S. PATENT DOCUMENTS

| | | | | |
|---|---|---|---|---|
| 7,425,951 | B2 * | 9/2008 | Fukushima et al. | 345/419 |
| 2007/0008314 | A1 * | 1/2007 | Song et al. | 345/419 |
| 2010/0033554 | A1 * | 2/2010 | Kobayashi | 348/43 |
| 2012/0013709 | A1 * | 1/2012 | Nishio | 348/43 |

FOREIGN PATENT DOCUMENTS

| | | |
|---|---|---|
| JP | 2005 65055 | 3/2005 |
| JP | 2007 271828 | 10/2007 |

* cited by examiner

*Primary Examiner* — Mohamed Ibrahim
(74) *Attorney, Agent, or Firm* — Frommer Lawrence & Haug LLP; William S. Frommer

(57) ABSTRACT

An image display device including: an image formation unit which forms images for the left and right eyes; a projecting section which emits light beams representing the images for the left and right eyes via optical filters having different properties to display an image in a superimposed manner; first and second converting sections respectively convert signals representing images for the left eye and for the right eye into image signals of different color spaces by using first and second color conversion coefficients determined so that the images for the left and right eyes displayed on the basis of the light beams passing through the optical filters may have desired properties; and a driving section which drives the image formation unit on the basis of the converted signals representing the images of the left and right eyes to form the images for the left and right eyes.

6 Claims, 10 Drawing Sheets

FIG. 2A
2D DISPLAY IMAGE
FIG. 2B
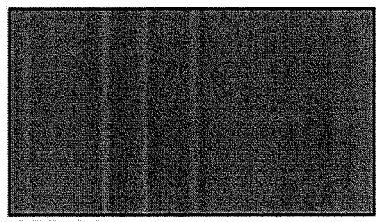 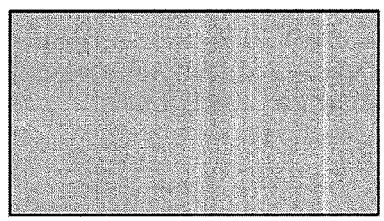
3D DISPLAY IMAGE (FOR LEFT EYE)  3D DISPLAY IMAGE (FOR RIGHT EYE)
FIG. 3
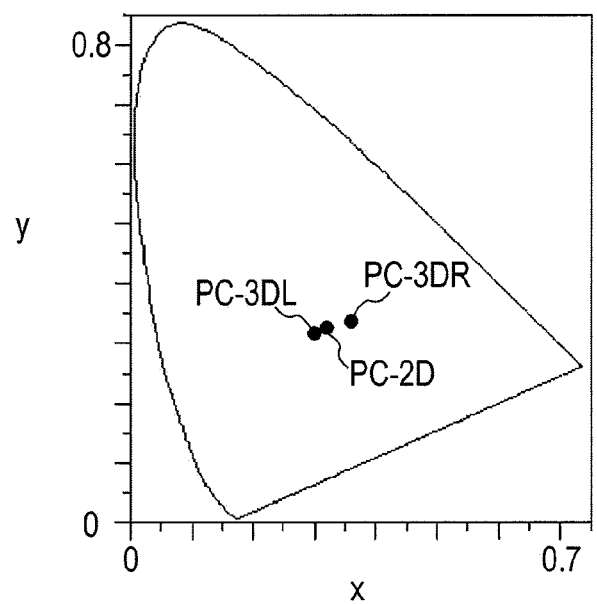

IMAGE-DISPLAYING DEVICE, METHOD AND SYSTEM

BACKGROUND OF THE INVENTION

1. Field of the Invention

The present invention relates to an image-displaying device, method and system. More particularly, the invention relates to an image-displaying method and system that display a stereoscopic image by emitting a light beam representing an image for the left eye and a light beam representing an image for the right eye.

2. Description of the Related Art

Systems that display a stereoscopic image by projecting an image for the left eye and an image for the right eye on a screen using a single image display device have been proposed. For example, Japanese Unexamined Patent Application Publication (JP-A) No. 2007-271828 discloses a system that projects a stereoscopic image using a split mirror. A display area of a display device is substantially divided into two image areas, i.e., an area for an image for the left eye and an area for an image for the right eye. Light beams representing the displayed images for the left and right eyes are split by a split mirror. The split light beams are then projected onto a screen in a superimposed manner via optical filters having different optical properties to form a stereoscopic image. JP-A-2005-65055 discloses a system that displays image content as a plane image on the basis of an input image signal representing a two-dimensional image content. JP-A-2005-65055 also discloses a system that displays an image content as a three-dimensional image on the basis of an input image signal representing a three-dimensional image content. An optical filter is used to, for example, switch polarization directions of light beams representing the image for the right eye and one image for the left eye.

Such an optical filter used to display a stereoscopic image, however, may cause changes in the properties of an image to be displayed.

For example, if a stereoscopic image is to be displayed using a wavelength division system, the wavelength of an emitted light beam is limited by the optical filter. FIGS. 1A to 1D illustrate functions of wavelength division filters for the left eye and for the right eye. FIG. 1A illustrates intensity of light beams incident to the wavelength division filters for the left eye and for the right eye as a model. FIG. 1B illustrates a filter characteristic of the wavelength division filter for the left eye. FIG. 1C illustrates a filter characteristic of the wavelength division filter for the right eye.

The light beam processed by the wavelength division filter for the left eye is divided into color components for the left eye shown in FIG. 1D. The light beam processed by the wavelength division filter for the right eye is divided into color components for the right eye shown in FIG. 1D.

When a plane image is to be displayed, a color space is converted so that an image of desired color can be displayed on the basis of an emitted light beam having the color components shown in FIG. 1A.

FIGS. 2A and 2B illustrate changes in property of a displayed plane image and a displayed stereoscopic image. Image display devices covert a color space so that an image to be displayed may have a desired color when a plane image is to be displayed on the basis of, for example, an image signal representing a two-dimensional image content, i.e., when a light beam having the color components shown in FIG. 1A is emitted. The image to be displayed may therefore have a desired color, as shown, for example, in FIG. 2A. A chromaticity point of the image shown in FIG. 2A herein is a position PC-2D in an xy chromaticity diagram shown in FIG. 3.

Next, when a stereoscopic image is to be displayed on the basis of an image signal representing a three-dimensional image content, a wavelength of a light beam passing through a wavelength division filter is limited as shown in FIG. 1D. Such limitation on the wavelength may cause changes in color or brightness of the images for the left eye and for the right eye as shown in FIG. 2B. The chromaticity point of the image for the left eye shown in FIG. 2B may be shifted to, for example, a position PC-3DL of FIG. 3. The chromaticity point of the image for the right eye shown in FIG. 2B may be shifted to, for example, a position PC-3DR of FIG. 3.

SUMMARY OF THE INVENTION

It is desirable to provide an image-displaying device, method and system with which a color space can be converted so that an image with desired property can be displayed even in a stereoscopic image.

A first embodiment of the invention is an image display device which includes: an image formation unit which forms an image for the left eye and an image for the right eye; a projecting section which emits a light beam representing the image for the left eye via an optical filter for the left eye and a light beam representing the image for the right eye via an optical filter for the right eye having properties different from those of the optical filter for the left eye to display an image in a superimposed manner; a first converting section which converts a signal representing an image for the left eye into an image signal of a different color space by using a first color conversion coefficient which is determined so that the image for the left eye displayed on the basis of the light beam passing through the optical filter for the left eye may have desired properties; a second converting section which converts a signal representing an image for the right eye into an image signal of a different color space by using a second color conversion coefficient which is determined so that the image for the right eye displayed on the basis of the light beam passing through the optical filter for the right eye may have desired properties; and a driving section which drives the image formation unit on the basis of the converted signal representing the image of the left eye and the converted signal representing the image of the right eye to form the image for the left eye and the image for the right eye.

A second embodiment of the invention is a method of displaying an image which includes the steps of: forming an image for the left eye and an image for the right eye by using an image formation unit; emitting a light beam representing the image for the left eye via an optical filter for the left eye and a light beam representing the image for the right eye via an optical filter for the right eye having properties different from those of the optical filter for the left eye to display an image in a superimposed manner by using a projecting section; converting a signal representing an image for the left eye into an image signal of a different color space by using a first color conversion coefficient which is determined so that the image for the left eye displayed on the basis of the light beam passing through the optical filter for the left eye may have desired properties by using a first converting section; converting a signal representing an image for the right eye into an image signal of a different color space by using a first color conversion coefficient which is determined so that the image for the right eye displayed on the basis of the light beam passing through the optical filter for the left eye may have desired properties by using a second converting section; and driving the image formation unit on the basis of the converted signal representing the image of the left eye and the converted signal representing the image of the right eye to form the image for the left eye and the image for the right eye by using a driving section.

A third embodiment of the invention is an image display system which includes: a device displaying an image for the left eye which includes an image formation unit for forming an image for the left eye and a projecting section which emits a light beam representing the image for the left eye via an optical filter for the left eye; and a device displaying an image for the right eye which includes an image formation unit forming an image for the right eye and a projecting section which emits a light beam representing the image for the right eye via an optical filter for the right eye, wherein: the device displaying an image for the left eye includes a first converting section which converts a signal representing an image for the left eye into an image signal of a different color space by using a first color conversion coefficient which is determined so that the image for the left eye displayed on the basis of the light beam passing through the optical filter for the left eye may have desired properties, and a driving section which drives the image formation unit on the basis of the converted signal representing the image of the left eye to form the image for the left eye; and the device displaying an image for the right eye includes a second converting section which converts a signal representing an image for the right eye into an image signal of a different color space by using a first color conversion coefficient which is determined so that the image for the right eye displayed on the basis of the light beam passing through the optical filter for the left eye may have desired properties, and a driving section which drives the image formation unit on the basis of the converted signal representing the image of the right eye to form the image for the right eye.

According to the invention, a signal representing an image for the left eye is converted into an image signal of a different color space by using a first color conversion coefficient which is determined so that the image for the left eye displayed on the basis of the light beam passing through an optical filter for the left eye, e.g., a wavelength division filter for the left eye, may have desired properties. A signal representing an image for the right eye is converted into an image signal of a different color space by using a second color conversion coefficient which is determined so that the image for the right eye displayed on the basis of the light beam passing through an optical filter for the right eye, e.g., a wavelength division filter for the right eye, may have desired properties. Further, an image signal representing a plane image is converted into an image signal of a different color space by using a third color conversion coefficient which is determined so that a plane image displayed on the basis of the light beam that has not passed through a wavelength division filter may have desired properties. A light beam representing the image for the left eye is formed on the basis of the converted signal representing the image for the left eye and a light beam representing the image for the right eye is formed on the basis of the converted signal representing the image for the right eye. These light beams are emitted to display a stereoscopic image without passing through a wavelength division filter. A light beam representing the plane image formed on the basis of the converted signal representing the converted plane image is emitted to display a plane image without passing through a wavelength division filter.

According to the invention, a signal representing an image for the left eye is converted into an image signal of a different color space by using a first color conversion coefficient which is determined so that the image for the left eye displayed on the basis of the light beam passing through an optical filter for the left eye may have desired properties. A signal representing an image for the right eye is converted into an image signal of a different color space by using a second color conversion coefficient which is determined so that the image for the right eye displayed on the basis of the light beam passing through an optical filter for the right eye may have desired properties. An image for the left eye is formed on the basis of the converted signal representing the image for the left eye and an image for the right eye is formed on the basis of the converted signal representing the image for the right eye. Light beams representing the images for the left and right eyes are emitted to pass through an optical filter for the left eye or the right eye to form a stereoscopic image. Accordingly, if a stereoscopic image is to be displayed, a color space is converted so that an image to be displayed may have desired properties. Thus, occurrence of variation in color or brightness between the image for the left eye and the image for the right eye can be prevented.

BRIEF DESCRIPTION OF THE DRAWINGS

FIG. 2 illustrates changes in characteristics of a displayed image when a plane image and a stereoscopic image are displayed.

FIG. 3 is an xy chromaticity diagram.

DESCRIPTION OF THE PREFERRED EMBODIMENTS

Hereinafter, a best mode for implementing the invention (hereinafter, referred to as an embodiment) will be described.

Figure 4:
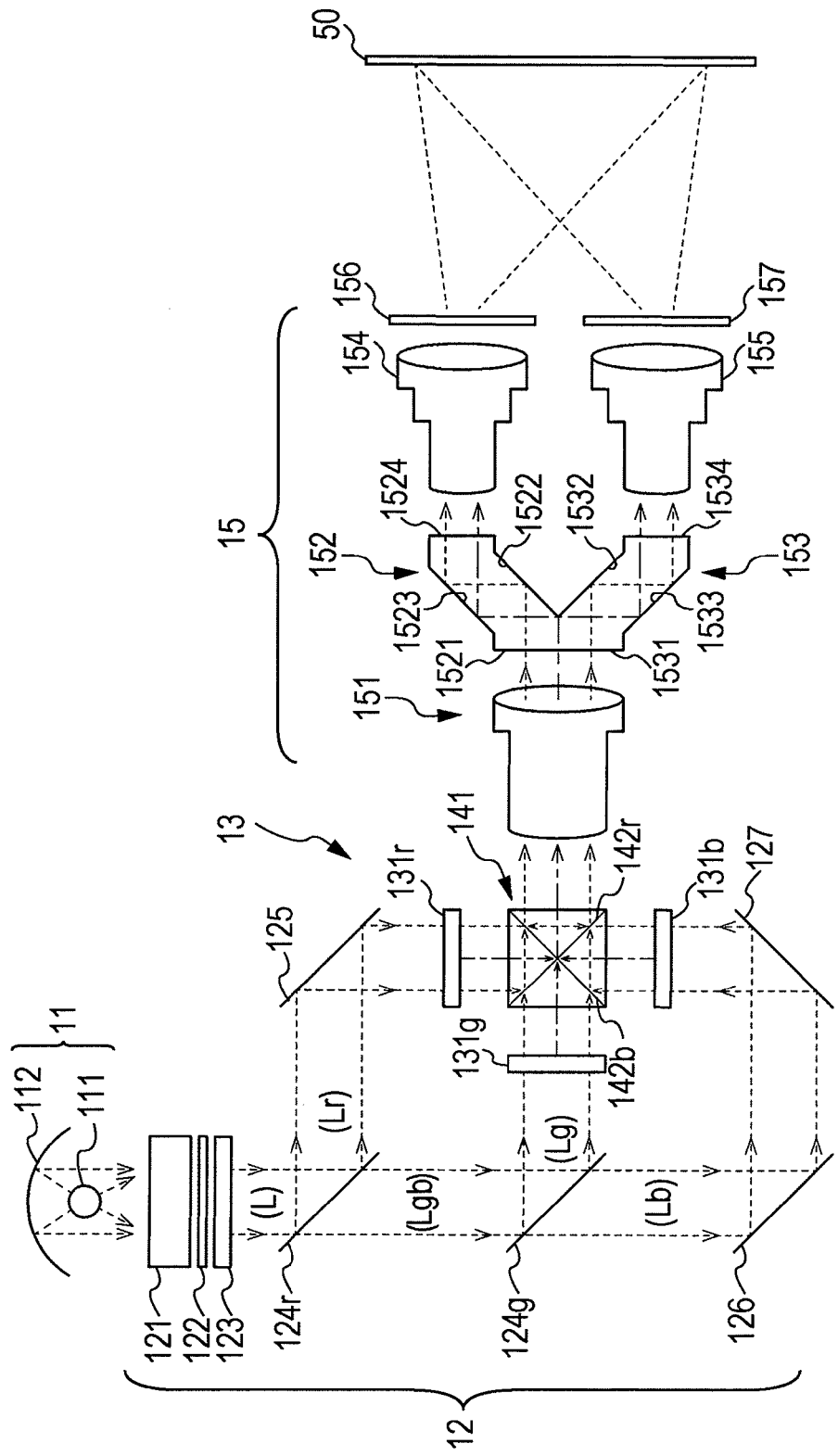
FIG. 4 shows a configuration of an optical system of an image display device.

Description will be given in the following order.
1. Configuration of optical system of image display device
2. Configuration of electric system of image display device
3. Operation of image display device
4. Determination of color conversion coefficient
5. Configuration of image display system
1. Configuration of Optical System of Image Display Device FIG. 4 shows a configuration of an optical system of an image display device 10. An optical section of the image display device 10 includes a light source 11, an illumination optical section 12, an image formation unit 13, an image synthesizer 14 and a projecting section 15. Although the image display device of FIG. 4 employs a wavelength division system which uses a wavelength division filter to display a stereoscopic image, the image display device 10 may alternatively employ a polarized light display system which uses a polarizing filter.

The light source 11 includes a light source 111 and a reflective collector mirror 112. The light source 111 may be a white light-emitting discharge lamp, such as an ultra-high pressure mercury lamp, a metal-halide lamp or a xenon lamp. The reflective collector mirror 112 collects the light beams from the light source 111 and then emits the collected light beams toward the illumination optical section 12.

The illumination optical section 12 includes a collimating lens 121, an optical filter 122, a micro lens array (MLA) 123, dichroic mirrors 124r and 124g, and reflective mirrors 125, 126 and 127.

The collimating lens 121 directs an illumination light beam from the light source 11 to the optical filter 122 as a parallel beam. The optical filter 122 removes light sections of unnecessary wavelengths from the illumination light beam. For example, the optical filter 122 removes the light sections in the infrared or ultraviolet region.

The MLA 123 includes arrayed multiple lenses. The MLA 123 divides, into multiple light beams, the illumination light beam from which light sections of unnecessary wavelengths have been removed, and collects the divided light beams. In this manner, the MLA 123 uniformly emits the illumination light beams to liquid crystal panels 131r, 131g and 131b, which will be described later.

The dichroic mirror 124r is disposed at, for example, 45 degrees with respect to an optical axis of the illumination light beam L emitted from the MLA 123. The dichroic mirror 124r reflects only a red light beam Lr of the illumination light beam L toward a reflective mirror 125 and allows light Lgb of other wavelength regions to pass therethrough.

The reflective mirror 125 is disposed at, for example, 45 degrees with respect to an optical axis of the red light beam Lr reflected by the dichroic mirror 124r. The reflective mirror 125 reflects the red light beam Lr toward the liquid crystal panel 131r.

The dichroic mirror 124r is disposed at, for example, 45 degrees with respect to an optical axis of the light Lgb which has passed through the dichroic mirror 124g. The dichroic mirror 124g reflects only a green light beam Lg among the light Lgb which has passed through the dichroic mirror 124r toward the liquid crystal panel 131g and allows light of other wavelength regions, i.e., a blue light beam Lb to pass therethrough.

The reflective mirror 126 is disposed at, for example, 45 degrees with respect to an optical axis of the blue light beam Lb which has passed through the dichroic mirror 124g, and reflects the blue light beam Lb toward the reflective mirror 127.

The reflective mirror 127 is disposed at, for example, 45 degrees with respect to an optical axis of the blue light beam Lb reflected by the reflective mirror 126, and reflects the blue light beam Lb toward the liquid crystal panel 131b.

The image formation unit 13 includes transmittive liquid crystal panels 131r, 131g and 131b. These liquid crystal panels 131r, 131g and 131b have display areas of the same shape and resolution. The image synthesizer 14 includes, for example, a dichroic prism 141. The liquid crystal panel 131r is disposed at a predetermined position relative to a surface of the cubic dichroic prism 141. The liquid crystal panel 131g is disposed at a predetermined position relative to another surface of the dichroic prism 141. The liquid crystal panel 131b is disposed at a predetermined position relative to a further surface of the dichroic prism 141.

The liquid crystal panel 131r is driven by a red driving signal DRr from driving sections 25L and 25R, which will be described later, to produce a red component of an image to be displayed. The red light beam Lr which represents a red component of the illumination light beam passing through the liquid crystal panel 131r is modulated by a red component of the image and is then introduced into the image synthesizer 14.

The liquid crystal panel 131g is driven by a green driving signal DRg from the driving sections 25L and 25R to produce a green component of the image to be displayed. The green light beam Lg which represents a green component of the illumination light beam passing through the liquid crystal panel 131g is modulated by the green component of the image and is then introduced into the image synthesizer 14.

The liquid crystal panel 131b is driven by a blue driving signal DRb from the driving sections 25L and 25R to produce a blue component of the image to be displayed. The blue light beam Lb which represents a blue component of the illumination light beam passing through the liquid crystal panel 131b is modulated by the blue component of the image and is then introduced into the image synthesizer 14.

The dichroic prism 141 is formed of multiple glass prisms joined together. Interference filters 142b and 142r having predetermined optical properties are provided on surfaces where the glass prisms are joined together. The interference filter 142b reflects the blue light beam Lb and allows the red light beam Lr and the green light beam Lg to pass therethrough. The interference filter 142r reflects the red light beam Lr and allows the green light beam Lg and the blue light beam Lb to pass therethrough. With this configuration, the light beams Lr, Lg, and Lb modulated by the liquid crystal panels 131r, 131g, and 131b are synthesized together and introduced into the projecting section 15.

Figure 5A:
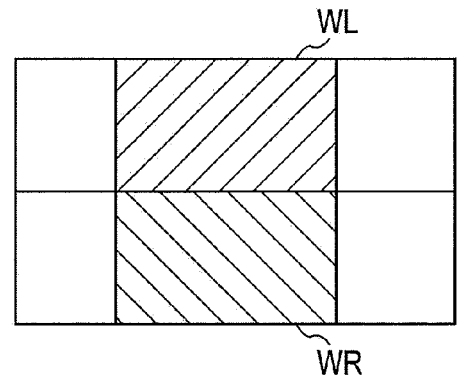
FIG. 5 illustrates an image incoming into a projecting section.
Figure 5B:
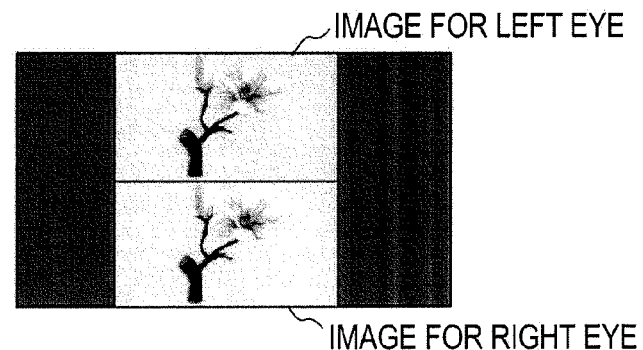

The liquid crystal panels 131r, 131g and 131b each have divided display areas in which each of the images of the color components for the left eye and for the right eye are produced. Accordingly, light beams representing the images for the left eye and for the right eye are introduced into the projecting section 15. FIG. 5 illustrates an image to be introduced into the projecting section 15. The display areas of the liquid crystal panels 131r, 131g and 131b may, for example, be divided vertically as shown in FIG. 5A, and the images of the color components may be produced at a display area for the left eye WL and a display area for the right eye WR indicated by hatching. In this case, the image to be introduced into the projecting section 15 is obtained as shown in FIG. 5B.

Figure 5C:
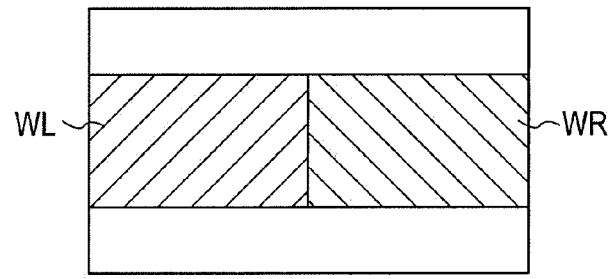
Figure 5D:
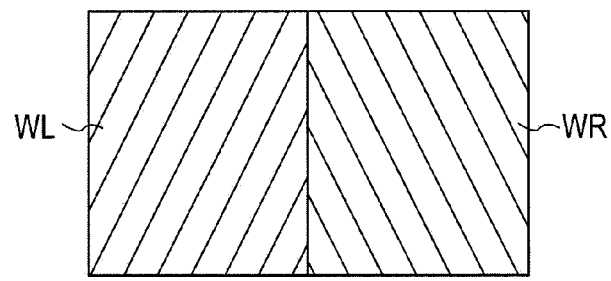

Alternatively, the display areas of the liquid crystal panels 131r, 131g and 131b may be divided horizontally as shown in FIG. 5C, and the images of the color components may be produced at a display area for the left eye WL and a display area for the right eye WR indicated by hatching. Further alternatively, the display areas of the liquid crystal panels 131r, 131g and 131b may be divided horizontally as shown in FIG. 5D, and the images of the color components may be produced in the entire areas.

The image formation unit 13 is not limited to including the transmissive liquid crystal panel, but may alternatively include a reflective liquid crystal panel. Each of the color components of the images to be displayed may be produced using a digital micro mirror device (DMD) provided with multiple fine reflective mirrors and may be introduced into the projecting section 15.

The projecting section 15 includes a relay lens 151, light guide sections 152 and 153, a projection lens for the left eye 154, a projection lens for the right eye 155, a wavelength division filter for the left eye 156, a wavelength division filter for the right eye 157 and a lens shifting mechanism 158.

The relay lens 151 is a lens system that transmits a real image. The relay lens 151 separates an image incident from the image synthesizer 14 into real images for the right eye and for the left eye and emits the real images toward the light guide section 152.

The light guide sections 152 and 153 separately guide the real image for the left eye and the real image for the right eye which are formed by the relay lens 151. The light guide section 152 includes an incident surface 1521, a first reflective surface 1522, a second reflective surface 1523 and an emission surface 1524. The incident surface 1521 is a surface into which the real image for the left eye is introduced. The first reflective surface 1522 reflects the real image for the left eye which is introduced from the incident surface 1521 at substantially 90 degrees with respect to the optical axis of the relay lens 151. The second reflective surface 1523 reflects the real image for the left eye reflected by the first reflective surface 1522 at substantially 90 degrees with respect to a direction which is parallel to the optical axis of the relay lens 151. The emission surface 1524 emits the real image for the left eye reflected by the second reflective surface 1523 toward the direction which is parallel to the optical axis of the relay lens 151.

The light guide section 153 includes an incident surface 1531, a first reflective surface 1532, a second reflective surface 1533 and an emission surface 1534. The incident surface 1531 is a surface into which the real image for the right eye is introduced. The first reflective surface 1532 reflects the real image for the right eye which is introduced from the incident surface 1531 at substantially 90 degrees with respect to the optical axis of the relay lens 151. The second reflective surface 1533 reflects the real image for the right eye reflected by the first reflective surface 1532 at substantially 90 degrees with respect to a direction which is parallel to the optical axis of the relay lens 151. The emission surface 1534 emits the real image for the right eye reflected by the second reflective surface 1533 in the direction which is parallel to the optical axis of the relay lens 151.

An optical path formed by the light guide section 152 and an optical path formed by the light guide section 153 are provided in the same plane and are disposed apart from each other in a direction perpendicular to the optical axis of the relay lens 151. The emission surface 1524 of the light guide section 152 and the emission surface 1534 of the light guide section 153 are thus disposed apart from each other by a predetermined distance in the direction perpendicular to the optical axis of the relay lens 151.

The projection lens for the left eye 154 projects the real image for the left eye guided by the light guide section 152 onto the screen 50 to form the image for the left eye.

The projection lens for the right eye 155 projects the real image of a synthesized image for the right eye guided by the light guide section 153 on the screen 50 to form the image for the right eye.

The projecting section 15 also includes the lens shifting mechanism 158. The lens shifting mechanism 158 adjusts a distance between the projection lens for the left eye 154 and the projection lens for the right eye 155 in the direction perpendicular to the optical axes thereof in a state in which the optical axis of the projection lens for the left eye 154 and the optical axis of the projection lens for the right eye 155 are parallel to each other. With this configuration, since the distance between the projection lens for the left eye 154 and the projection lens for the right eye 155 is adjusted by the lens shifting mechanism 158, the image for the left eye and the image for the right eye can be displayed on the screen 50 in a superimposed manner irrespective of the distance to the screen 50.

The wavelength division filter for the left eye 156 is disposed on the emission surface of the projection lens for the left eye 154 and performs wavelength division of the image for the left eye emitted from the projection lens for the left eye 154 and transmits the image for the left eye having a predetermined wavelength component. The wavelength division filter for the right eye 157 is disposed on the emission surface of the projection lens for the right eye 155 and divides the wavelength of the image for the right eye emitted from the projection lens for the right eye 155. The filter 157 allows the image for the right eye having wavelength components different from those of the wavelength division filter for the left eye 156 to pass therethrough. The wavelength division filter for the left eye 156 may be provided on the incident surface of the projection lens for the left eye 154 and the wavelength division filter for the right eye 157 may be provided on the incident surface of the projection lens for the right eye 155.

Figure 1A:
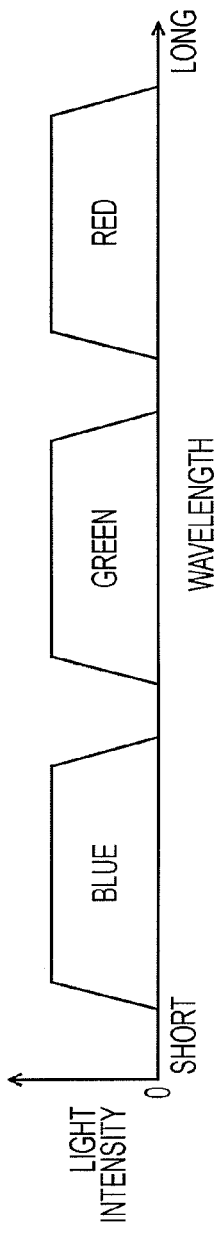
FIG. 1 describes functions of a wavelength division filter for the left eye and a wavelength division filter for the right eye.
Figure 1B:
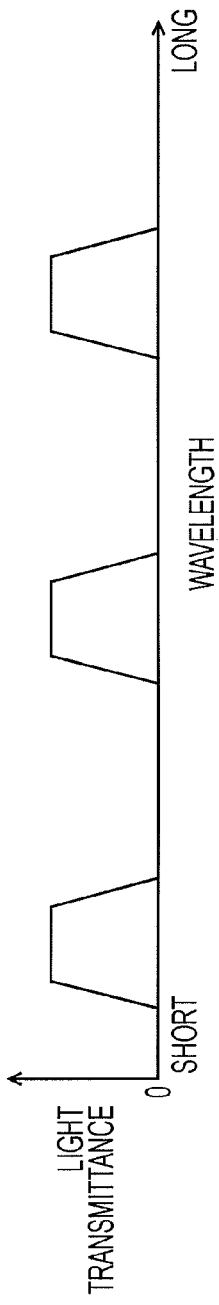
Figure 1C:

The wavelength division filter for the left eye 156 may have a filter characteristic shown, for example, in FIG. 1B. The wavelength division filter for the right eye 157 may have a filter characteristic shown, for example, in FIG. 1C.

Figure 1D:
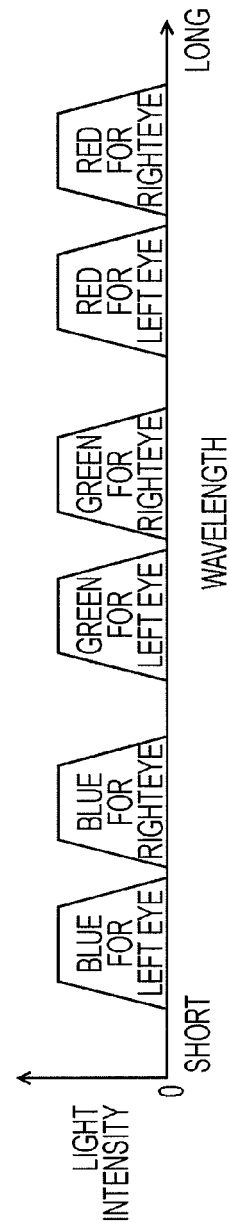

The light beam filtered by the wavelength division filter for the left eye 156 becomes a light beam of each color component for the left eye shown in FIG. 1D. The light beam filtered by the wavelength division filter for the right eye 157 becomes a light beam of each color component for the right eye shown in FIG. 1D.

Accordingly, the image for the left eye and the image for the right eye having different wavelengths are displayed in a superimposed manner on the screen 50. A viewer may confirm the image on the screen 50 stereoscopically with an eyeglass having a wavelength division filter for the left eye as a left lens and a wavelength division filter for the right eye as a right lens.

2. Configuration of Electric System of Image Display Device

Figure 6:
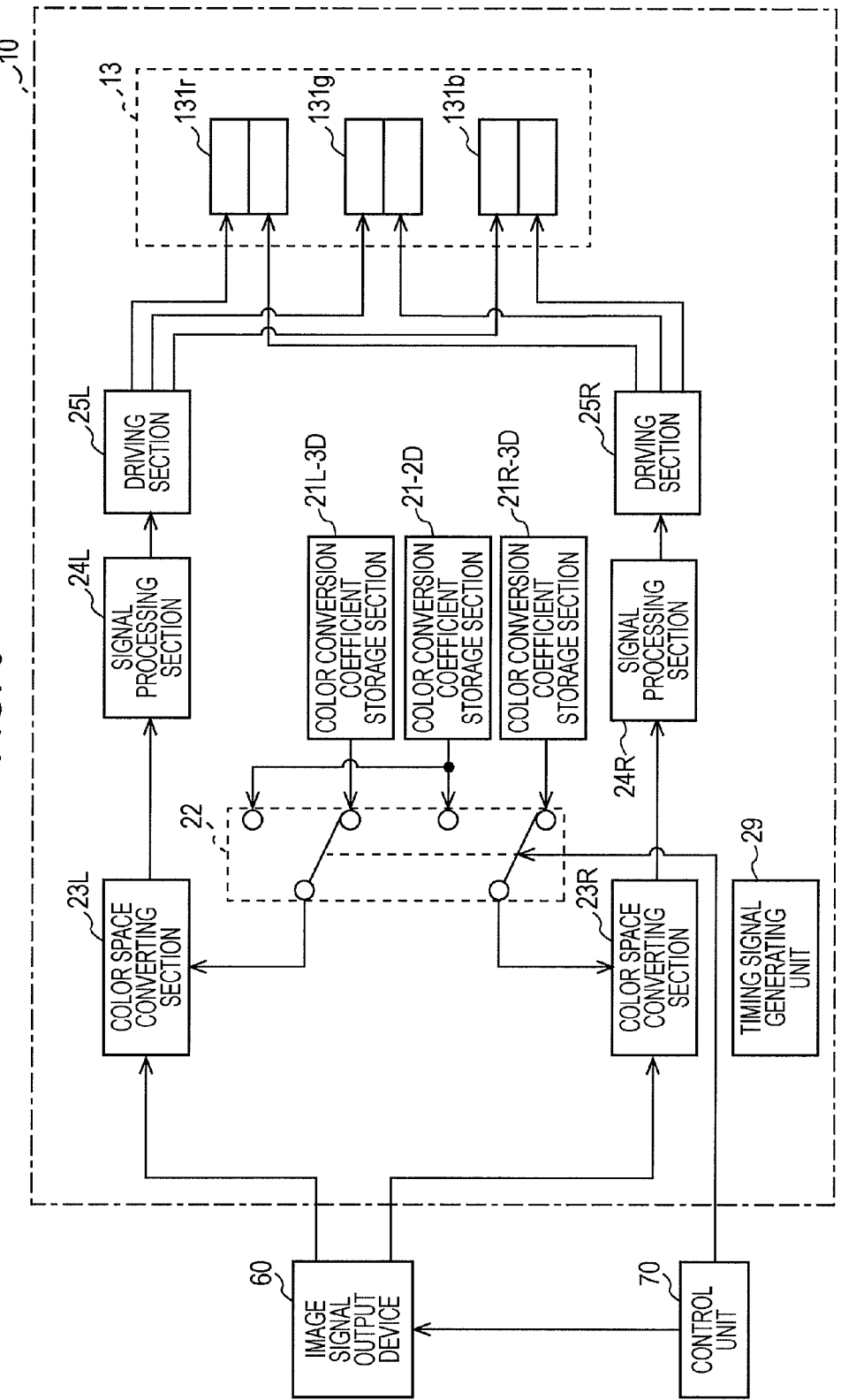
FIG. 6 is a block diagram showing a configuration of an electric system of the image display device.

Next, a configuration of an electric system of the image display device will be described with reference to FIG. 6. The image display device 10 includes color conversion coefficient storage sections 21-2D, 21L-3D and 21R-3D, a color conversion coefficient selecting section 22, converting sections 23L, 23R, signal processing sections 24L, 24R, driving sections 25L, 25R and a timing signal generating section 29. An image signal output device 60 and a control unit 70 are connected to the image display device 10.

The image signal output device 60 reads a recording medium storing an image content of a plane image (hereinafter referred to as a "two-dimensional content") and supplies a signal representing the plane image to the image display device 10. The image signal output device 60 also reads a recording medium storing an image content of a stereoscopic image (hereinafter referred to as a "three-dimensional content") and supplies a signal representing the image for the left eye and a signal representing the image for the right eye to the image display device 10.

The control unit 70 controls the image signal output device 60 so that the image signal output device 60 outputs image signals representing a desired two-dimensional content and a three-dimensional content. The control unit 70 sends, to the image display device 10, an identification signal indicating whether the image signal output from the image signal output device 60 represents the two-dimensional content or the three-dimensional content.

The color conversion coefficient selecting section 22 is connected to the converting sections 23L and 23R of the image display device 10. The color conversion coefficient storage sections 21-2D, 21L-3D and 21R-3D are connected to the color conversion coefficient selecting section 22.

A color conversion coefficient is stored in advance in the color conversion coefficient storage section 21-2D. The color conversion coefficient is determined to provide a plane image of the two-dimensional content having desired properties when the color space of the image signal supplied from the image signal output device 60 is converted by the converting sections 23L and 23R. For example, a color conversion coefficient which is determined so that the plane image of the two-dimensional content may have desired color and brightness may be stored in advance in the color conversion coefficient storage section 21-2D.

A color conversion coefficient is stored in advance in the color conversion coefficient storage section 21L-3D. The color conversion coefficient is determined to provide an image for the left eye of the three-dimensional content having desired properties when the color space is converted by the converting section 23L. For example, a color conversion coefficient which is determined so that the image for the left eye of the three-dimensional content may have the minimum variation in color or brightness as compared to that of the plane image of the two-dimensional content may be stored in advance in the color conversion coefficient storage section 21L-3D.

A color conversion coefficient is stored in advance in the color conversion coefficient storage section 21R-3D. The color conversion coefficient is determined to provide an image for the right eye of the three-dimensional content having desired properties when the color space is converted by the converting section 23R. For example, a color conversion coefficient which is determined so that the image for the right eye of the three-dimensional content may have the minimum variation in color or brightness as compared to those of the plane image of the two-dimensional content or the image for the right eye of the three-dimensional content may be stored in advance in the color conversion coefficient storage section 21R-3D.

The color conversion coefficient selecting section 22 selects the color conversion coefficient to be used in the converting sections 23L and 23R on the basis of the identification signal from the control unit 70. In particular, when displaying the image of the two-dimensional content, the color conversion coefficient selecting section 22 selects the color conversion coefficient storage section 21-2D so that the color conversion coefficient stored in the color conversion coefficient storage section 21-2D is used by the converting sections 23L and 23R. When displaying the image of the three-dimensional content, the color conversion coefficient selecting section 22 selects the color conversion coefficient storage section 21L-3D so that the color conversion coefficient stored in the color conversion coefficient storage section 21L-3D is used by the converting section 23L. The color conversion coefficient selecting section 22 may select the color conversion coefficient storage section 21R-3D so that the color conversion coefficient stored in the color conversion coefficient storage section 21R-3D is used by the converting section 23R.

The converting section 23L converts the color space using the color conversion coefficient stored in the color conversion coefficient storage section selected by the color conversion coefficient selecting section 22. The converting section 23R converts the color space using the color conversion coefficient stored in the color conversion coefficient storage section selected by the color conversion coefficient selecting section 22.

The converting sections 23L and 23R may perform an operation as shown in Equation 1 using, for example, input trichromatic image signals, namely, a red image signal DSr, a green image signal DSg and a blue image signal DSb to generate a red image signal DSrc, a green image signal DSgc and a blue image signal DSbc.

Equation 1

$$\begin{bmatrix} DSrc \\ DSgc \\ DSbc \end{bmatrix} = \begin{bmatrix} k11 & k12 & k13 \\ k21 & k22 & k23 \\ k31 & k32 & k33 \end{bmatrix} \times \begin{bmatrix} DSr \\ DSg \\ DSb \end{bmatrix} \quad (1)$$

In Equation 1, k11, k12, k13, k21, k22, k23, k31, k32, k33 are the color conversion coefficients stored in the color conversion coefficient storage section selected by the color conversion coefficient selecting section 22. The signal level of the red image signal DSrc, the green image signal DSgc and the blue image signal DSbc may vary depending on the coefficients k11, k12, k13, k21, k22, k23, k31, k32 and k33. Accordingly, the coefficients k11, k12, k13, k21, k22, k23, k31, k32 and k33 may be changed to produce an image having desired properties, e.g., a desired chromaticity point, displayed on the basis of the red image signal DSrc, the green image signal DSgc and the blue image signal DSbc. If the coefficients k11, k12, k13, k21, k22, k23, k31, k32 and k33 are changed at a constant rate, the signal levels of the red image signal DSrc, the green image signal DSgc and the blue image signal DSbc are also changed at a constant rate accordingly. Thus, an image displayed on the basis of the red image signal DSrc, the green image signal DSgc and the blue image signal DSbc may have desired properties, e.g., desired brightness.

Figure 7:
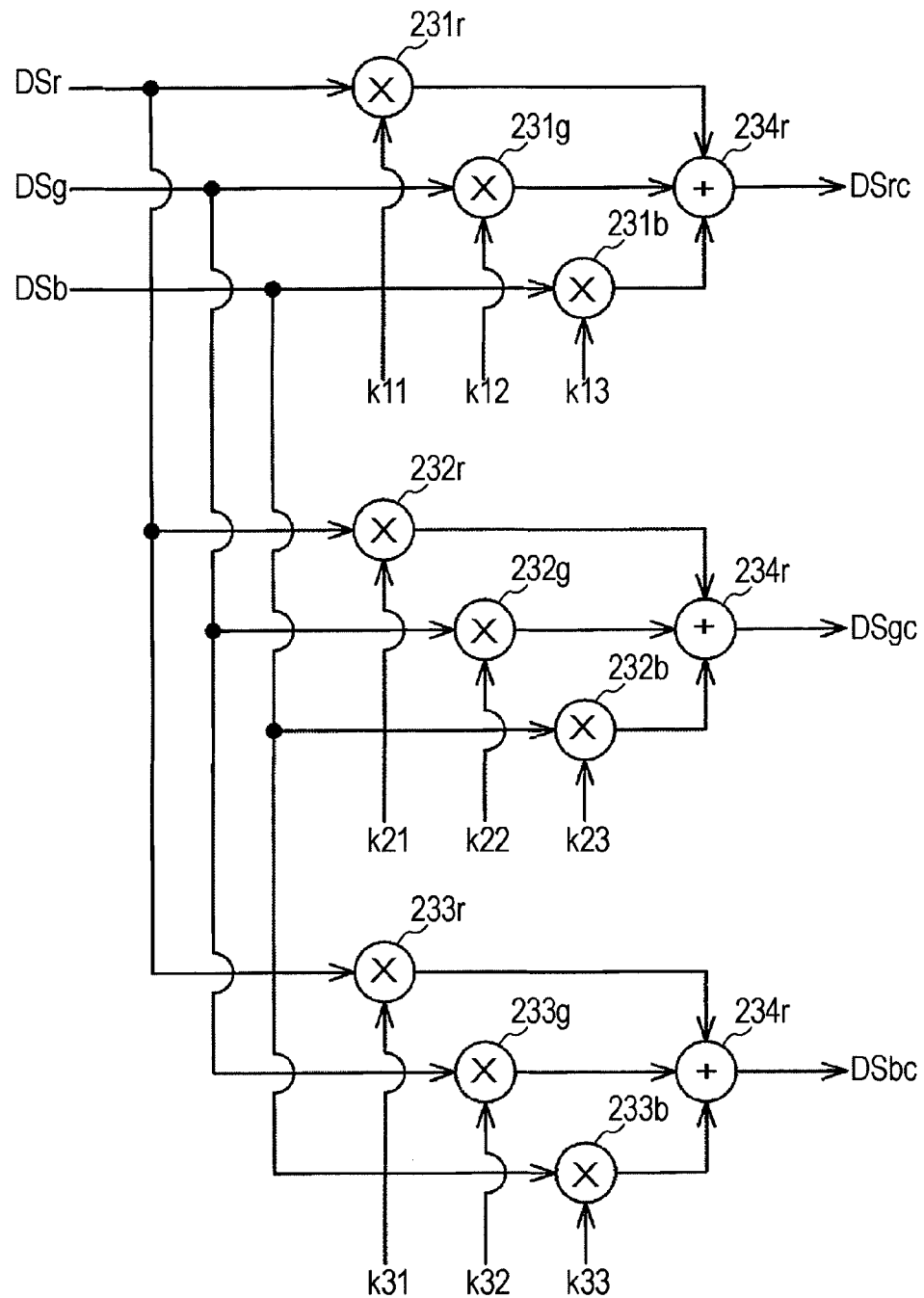
FIG. 7 shows a configuration of a converting section.

FIG. 7 illustrates a configuration of the converting section. The red image signal DSr is supplied to multipliers 231r, 232r and 233r. The green image signal DSg is supplied to multipliers 231g, 232g and 233g. The blue image signal DSb is supplied to multipliers 231b, 232b and 233b.

The color conversion coefficients k11, k21 and k31 selected by the color conversion coefficient selecting section 22 are supplied to the multipliers 231r, 232r and 233r. The color conversion coefficients k12, k22 and k32 are supplied to the multipliers 231g, 232g and 233g. The color conversion coefficients k13, k23 and k33 are supplied to the multipliers 231b, 232b and 233b.

The multiplier 231r multiplies the coefficient k11 by the red image signal DSr and supplies the multiplication result to an adder 234r. The multiplier 231g multiplies the coefficient k12 by the green image signal DSg and supplies the multiplication result to the adder 234r. The multiplier 231b multiplies the coefficient k13 by the blue image signal DSb and supplies the multiplication result to the adder 234r. The adder 234r adds the multiplication results supplied from the multipliers 231r, 231g and 231b, and generates the red image signal DSrc having a converted color space.

The multiplier 232r multiplies the coefficient k21 by the red image signal DSr and supplies the multiplication result to the adder 234g. The multiplier 232g multiples the coefficient k22 by the green image signal DSg and supplies the multiplication result to the adder 234g. The multiplier 232b multiplies the coefficient k23 by the blue image signal DSb and supplies the multiplication result to the adder 234g. The adder 234g adds the multiplication results supplied from the multipliers 232r, 232g and 232b and generates the green image signal DSgc of the color space that has been converted.

A multiplier 233r multiplies the coefficient k31 by the red image signal DSr and supplies the multiplication result to the adder 234b. The multiplier 233g multiplies the coefficient k32 by the green image signal DSg and supplies the multiplication result to the adder 234b. The multiplier 233b multiplies the coefficient k33 by the blue image signal DSb and supplies the multiplication result to the adder 234b. The adder 234b adds the multiplication results supplied from the multipliers 233r, 233g and 233b and generates a blue image signal DSbc having a converted color space.

The converting section 23L converts the color space as described above using the image signal supplied from the image signal output device 60 and the color conversion coefficient stored in the color conversion coefficient storage section selected by the color conversion coefficient selecting section 22, and supplies the converted image signal to the signal processing section 24L. The converting section 23R converts the color space as described above using the image signal supplied from the image signal output device 60 and the color conversion coefficient stored in the color conversion coefficient storage section selected by the color conversion coefficient selecting section 22, and supplies the converted image signal to the signal processing section 24R.

The signal processing section 24L performs various signal processings as necessary on the converted signal representing the image of the left eye. Examples of the signal processing include conversion of a frame rate to be suited to the image formation unit 13, conversion of an interlace signal to a progressive signal, and conversion of the resolution of the input signal representing the image of the left eye so as to be suitable for the image formation unit 13. The signal processing section 24L also supplies the processed signal representing the image of the left eye to the driving section 25L. The signal processing section 24R also performs various processings similar to those in the signal processing section 24L as necessary and supplies the processed signal representing the image of the right eye to the driving section 25R.

The driving section 25L generates a driving signal for driving a display area for the left eye of the liquid crystal panel 131r on the basis of the red image signal supplied from the signal processing section 24L and outputs the generated driving signal to the liquid crystal panel 131r. The driving section 25L generates a driving signal for driving the display area for the left eye of the liquid crystal panel 131g on the basis of the green image signal supplied from the signal processing section 24L and outputs the generated driving signal to the liquid crystal panel 131g. The driving section 25L generates a driving signal for driving the display area for the left eye of the liquid crystal panel 131b on the basis of the blue image signal supplied from the signal processing section 24L and outputs the generated driving signal to the liquid crystal panel 131b.

The driving section 25R generates a driving signal for driving a display area for the right eye of the liquid crystal panel 131r on the basis of the red image signal supplied from the signal processing section 24R and outputs the generated driving signal to the liquid crystal panel 131r. The driving section 25R generates a driving signal for driving the display area for the right eye of the liquid crystal panel 131g on the basis of a green image signal supplied from the signal processing section 24R and outputs the generated driving signal to the liquid crystal panel 131g. The driving section 25R generates a driving signal for driving the display area for the right eye of the liquid crystal panel 131b on the basis of the blue image signal supplied from the signal processing section 24R, and outputs the generated driving signal to the liquid crystal panel 131b.

The timing signal generating section 29 generates various timing signals on the basis of a synchronized signal supplied from the image signal output device 60 or a synchronized signal extracted from the image signal supplied to the image display device 10. The timing signal generating section 29 supplies the generated timing signals to the color conversion coefficient storage sections 21-2D, 21L-3D and 21R-3D and the converting sections 23L and 23R so that these sections operate in a synchronized manner.

3. Operation of Image Display Device

Next, an operation of the image display device will be described. In order to display the image of the two-dimensional content, the control unit 70 controls the image signal output device 60 so that the image display device 10 outputs the image signal representing the two-dimensional content. The control unit 70 outputs, to the image display device 10, an identification signal indicating that the image signal output from the image signal output device 60 is the image signal representing the two-dimensional content.

When the identification signal from the control unit 70 indicates that the signal is the image signal representing the two-dimensional content, the color conversion coefficient selecting section 22 selects the color conversion coefficient storage section 21-2D. The color conversion coefficient which is determined so that the image to be displayed may have desired color and brightness when the image of the two-dimensional content is to be displayed is stored in advance in the color conversion coefficient storage section 21-2D.

The converting section 23L converts the color space using the color conversion coefficient for each pixel retrieved from the color conversion coefficient storage section 21-2D and outputs the converted image signal to the signal processing section 24L. The converting section 23R, as well as the converting section 23L, converts the color space using the color conversion coefficient retrieved from the color conversion coefficient storage section 21-2D and outputs the converted image signal to the signal processing section 24R.

The signal processing section 24L performs various processings as necessary, such as frame rate conversion, IP conversion and resolution conversion and supplies the processed image signal to the driving section 25L. The signal processing section 24R also performs similar processings as those in the signal processing section 24L as necessary and supplies the processed image signal to the driving section 25R.

The driving section 25L generates a driving signal for driving the display area for the left eye of the liquid crystal panel 131r on the basis of the red image signal supplied from the signal processing section 24L and outputs the generated driving signal to the liquid crystal panel 131r. The driving section 25L generates a driving signal for driving the display area for the left eye of the liquid crystal panel 131g on the basis of the green image signal supplied from the signal processing section 24L and outputs the generated driving signal to the liquid crystal panel 131g. The driving section 25L generates a driving signal for driving the display area for the left eye of the liquid crystal panel 131b on the basis of the blue image signal supplied from the signal processing section 24L and outputs the generated driving signal to the liquid crystal panel 131b.

The driving section 25R generates a driving signal for driving the display area for the right eye of the liquid crystal panel 131r on the basis of the red image signal supplied from the signal processing section 24R and outputs the generated driving signal to the liquid crystal panel 131r. The driving section 25R generates a driving signal for driving the display area for the right eye of the liquid crystal panel 131g on the basis of the green image signal supplied from the signal processing section 24R and outputs the generated driving signal to the liquid crystal panel 131g. The driving section 25R generates a driving signal for driving the display area for the right eye of the liquid crystal panel 131b on the basis of the converted blue image signal supplied from the signal processing section 24R and outputs the generated driving signal to the liquid crystal panel 131b.

The image display device 10 displays an image on the screen 50 using neither the wavelength division filter for the left eye 156 nor the wavelength division filter for the right eye 157.

As described above, the converting sections 23L and 23R convert the color space so that the image to be displayed may have desired color and brightness when the image of the two-dimensional content is to be displayed on the screen 50. Accordingly, the image of the two-dimensional content displayed may have the desired color or brightness.

As described above, the control unit 70 controls the image signal output device 60 so that the control unit 70 outputs the image signal of the three-dimensional content to the image display device 10. The control unit 70 outputs, to the image display device 10, the identification signal indicating that the image signal output from the image signal output device 60 is the image of the three-dimensional content.

The color conversion coefficient selecting section 22 selects the color conversion coefficient storage sections 21L-3D and 21R-3D when the identification signal from the control unit 70 is the image signal of the three-dimensional content. The color conversion coefficient which is determined so that the image to be displayed may have a desired color and brightness when the image for the left eye of the three-dimensional content is to be displayed is stored in advance in the color conversion coefficient storage section 21L-3D. The color conversion coefficient which is determined so that the image to be displayed may have a desired color and brightness when the image for the right eye of the three-dimensional content is to be displayed is stored in advance in the color conversion coefficient storage section 21R-3D.

The converting section 23L converts the color space using the color conversion coefficient stored in the color conversion coefficient storage section 21L-3D selected by the color conversion coefficient selecting section 22 and outputs the converted image signal to the signal processing section 24L. The converting section 23R converts the color space using the color conversion coefficient retrieved from the color conversion coefficient storage section 21R-3D and outputs the converted image signal to the signal processing section 24R.

The signal processing section 24L performs various processings as necessary, such as frame rate conversion, IP conversion and resolution conversion and supplies the processed image signal to the driving section 25L. The signal processing section 24R also performs similar processings as those in the signal processing section 24L as necessary and supplies the processed image signal to the driving section 25R.

The driving section 25L generates a driving signal for driving the display area for the left eye of the liquid crystal panel 131r on the basis of the red image signal supplied from the signal processing section 24L and outputs the generated driving signal to the liquid crystal panel 131r. The driving section 25L generates a driving signal for driving the display area for the left eye of the liquid crystal panel 131g on the basis of the green image signal supplied from the signal processing section 24L and outputs the generated driving signal to the liquid crystal panel 131g. The driving section 25L generates a driving signal for driving the display area for the left eye of the liquid crystal panel 131b on the basis of the blue image signal supplied from the signal processing section 24L and outputs the generated driving signal to the liquid crystal panel 131b.

The driving section 25R generates a driving signal for driving the display area for the right eye of the liquid crystal panel 131r on the basis of the red image signal supplied from the signal processing section 24R and outputs the generated driving signal to the liquid crystal panel 131r. The driving section 25R generates a driving signal for driving the display area for the right eye of the liquid crystal panel 131g on the basis of the green image signal supplied from the signal processing section 24R and outputs the generated driving signal to the liquid crystal panel 131g. The driving section 25R generates a driving signal for driving the display area for the right eye of the liquid crystal panel 131b on the basis of the converted blue image signal supplied from the signal processing section 24R and outputs the generated driving signal to the liquid crystal panel 131b.

The image display device 10 displays an image on the screen 50 using the wavelength division filter for the left eye 156 and the wavelength division filter for the right eye 157.

Thus, upon displaying a stereoscopic image of the three-dimensional content, the converting sections 23L and 23R convert the color space using the color conversion coefficient which is determined so that the stereoscopic image of the three-dimensional content displayed on the screen 50 may have a desired color and brightness. With this configuration, large variation in color and brightness between the image for the left eye of the three-dimensional content and the image for the right eye of the three-dimensional content upon displaying the stereoscopic image can be prevented. In addition, changes in color or brightness can be reduced as compared to the display of the plane image of the two-dimensional content.

4. Determination of Color Conversion Coefficient

Next, determination of the color conversion coefficient stored in the color conversion coefficient storage section will be described. The color conversion coefficient may be determined during a manufacturing process of the image display device or during servicing.

Figure 8:
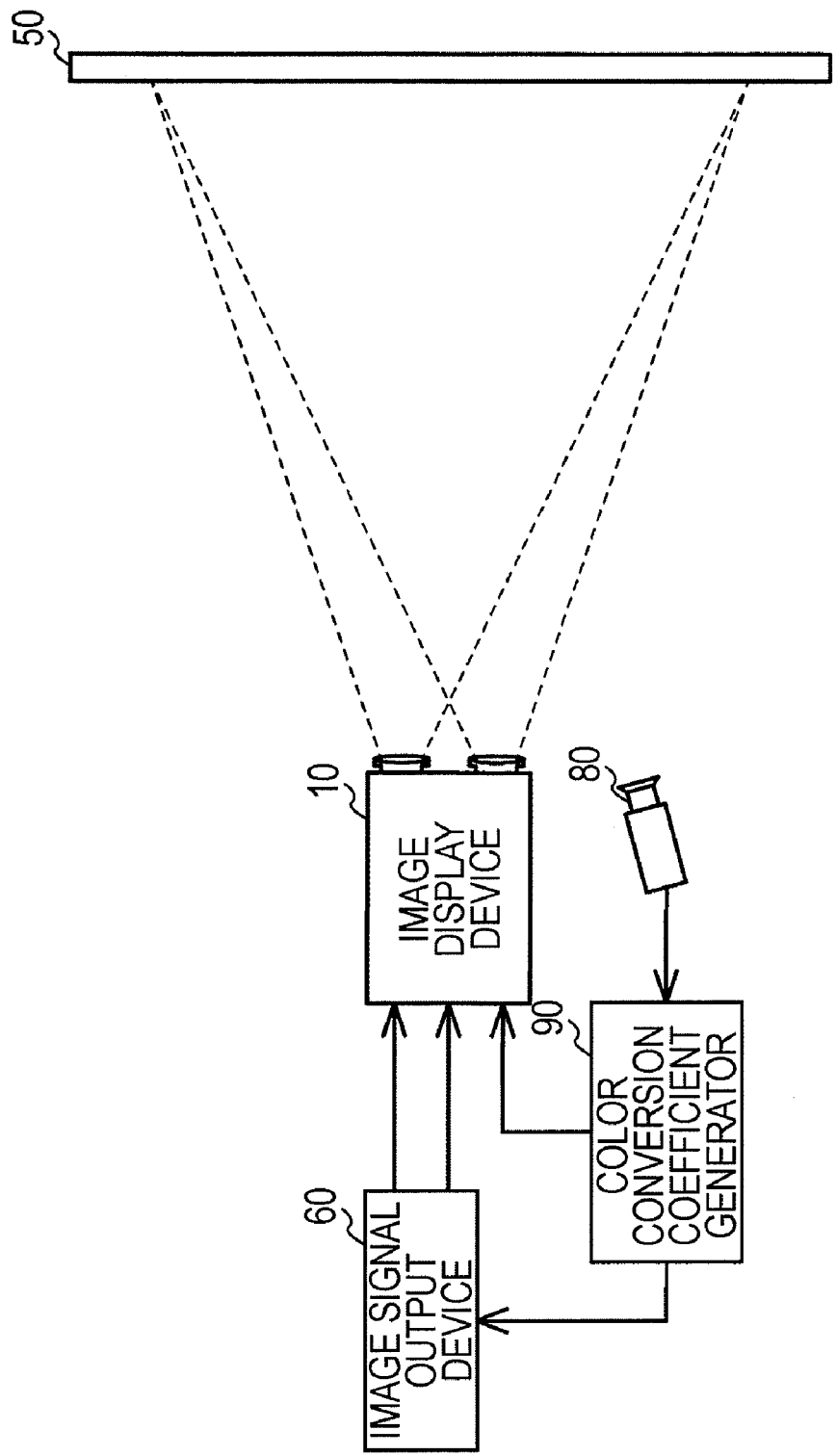
FIG. 8 illustrates determination of a color conversion coefficient.

The color conversion coefficient may be determined using, as shown in FIG. 8, the image display device 10, the screen 50, the image signal output device 60, an imaging unit 80 and a color conversion coefficient generator 90. The image signal output device 60 outputs, to the image display device 10, an image signal for measurement, e.g., a signal representing an image with constant brightness and being colorless or single-colored. The imaging unit 80 photographs an image displayed on the screen 50 by the image display device 10 and generates an image signal. The imaging unit 80 supplies the generated image signal to the color conversion coefficient generator 90. The color conversion coefficient generator 90 includes a measuring device and a computer device for measuring the chromaticity point and brightness on the basis of the input image signal. The color conversion coefficient generator 90 also generates a color conversion coefficient so that an image currently displayed on the basis of the measurement result may have the desired chromaticity point and brightness and stores the generated color conversion coefficient in the color conversion coefficient storage sections 21-2D, 21L-3D and 21R-3D.

If a color conversion coefficient is to be determined for the color conversion coefficient storage section 21-2D used to display an image of the two-dimensional content, the color conversion coefficient generator 90 controls the image signal output device 60 so that the image signal for measurement is input into the converting sections 23L and 23R of the image display device 10. The color conversion coefficient storage section 21-2D sets the coefficients k11, k22 and k33 to "1" as an initial value of the color conversion coefficient and sets other coefficients to "0." The image signal input into the converting sections 23L and 23R is output to the signal processing sections 24L and 24R as it is. The image display device 10 displays an image on the screen 50 using neither the wavelength division filter for the left eye 156 nor the wavelength division filter for the right eye 157.

The imaging unit 80 photographs an image displayed on the screen 50 and generates an image signal. The imaging unit 80 supplies the generated image signal to the color conversion coefficient generator 90. The color conversion coefficient generator 90 measures the chromaticity point and brightness on the basis of the image signal generated by the imaging unit 80. The color conversion coefficient generator 90 generates a color conversion coefficient on the basis of the measurement result so that the desired chromaticity point and brightness may be obtained and stores the generated color conversion coefficient in the color conversion coefficient storage section 21-2D.

If the color conversion coefficient is determined for the color conversion coefficient storage sections 21L-3D and 21R-3D which are used to display an image of the three-dimensional content, the color conversion coefficient generator 90 controls the image signal output device 60 so that the image signal for measurement is input into the converting section 23L of the image display device 10. The color conversion coefficient storage section 21-3D sets the coefficients k11, k22 and k33 to "1" as an initial value of the color conversion coefficient and sets other coefficients to "0." The image signal input into the converting section 23L is made to output to the signal processing section 24L as it is. An image is displayed on the screen 50 using the wavelength division filter for the left eye 156. The imaging unit 80 generates an image signal by photographing an image displayed on the screen 50 via a wavelength division filter of a characteristic equivalent to that of the wavelength division filter for the left eye 156. The imaging unit 80 supplies the generated image signal to the color conversion coefficient generator 90. The color conversion coefficient generator 90 measures the chromaticity point and brightness on the basis of the image signal generated by the imaging unit 80, generates a color conversion coefficient which may produce desired chromaticity point and brightness on the basis of the measurement result and the generated color conversion coefficient is stored in the color conversion coefficient storage section 21L-3D.

Next, the color conversion coefficient generator 90 controls the image signal output device 60 to cause a predetermined image signal for measurement to be stored into the converting section 23R of the image display device 10. The color conversion coefficient storage section 21-3D sets the coefficients k11, k22 and k33 to "1" as an initial value of the color conversion coefficient and sets other coefficients to "0." The image signal input into the converting section 23R is output to the signal processing section 24R as it is. The image is displayed on the screen 50 using the wavelength division filter for the right eye 157. The imaging unit 80 generates the image signal by photographing an image displayed on the screen 50 via a wavelength division filter of the characteristic equivalent to that of the wavelength division filter for the right eye 157. The imaging unit 80 supplies the generated image signal to the color conversion coefficient generator 90. The color conversion coefficient generator 90 measures the chromaticity point and brightness on the basis of the image signal generated by the imaging unit 80, generates a color conversion coefficient so that a produced image may have the desired chromaticity point and brightness on the basis of the measurement result and causes the color conversion coefficient storage section 21R-3D to store the generated color conversion coefficient.

These processes may be performed during manufacturing or during servicing. Thus, the color conversion coefficient optimum to the plane image of the two-dimensional content having the desired color and brightness can be stored in the color conversion coefficient storage section 21-2D. The color conversion coefficient suitable to reduce variation in color and brightness of the image for the left eye of the three-dimensional content with respect to the plane image of the two-dimensional content can be stored in the color conversion coefficient storage section 21L-3D. The color conversion coefficient suitable to reduce variation in color and brightness of the image for the right eye of the three-dimensional content with respect to the plane image of the two-dimensional content, or the image for the left eye of the three-dimensional content can be stored in the color conversion coefficient storage section 21R-3D.

5. Configuration of Image Display System

Figure 9:
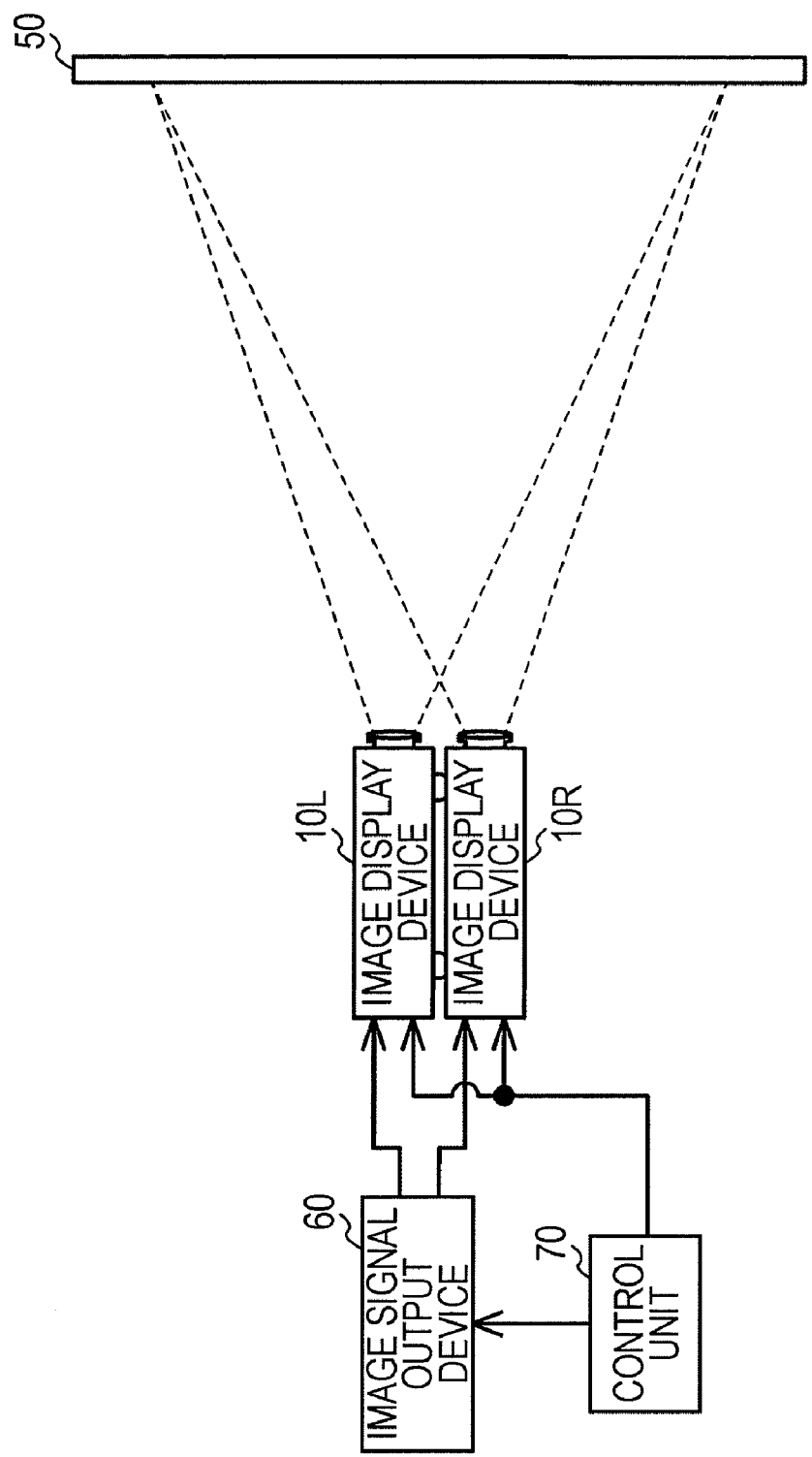
FIG. 9 shows a configuration of the image display system.

In the foregoing embodiment, the display area of the liquid crystal panel is divided into the area for the image for the left eye and the area for the image for the right eye. The light beam representing the image for the left eye and the light beam representing the image for the right eye are emitted from a single image display device to display a stereoscopic image. However, the stereoscopic image may alternatively be displayed using other devices. For example, as shown in FIG. 9, an image display device 10L displaying an image for the left eye and an image display device 10R displaying the image for the right eye may be stacked together to form an image display system which displays a stereoscopic image on the screen 50.

Figure 10:
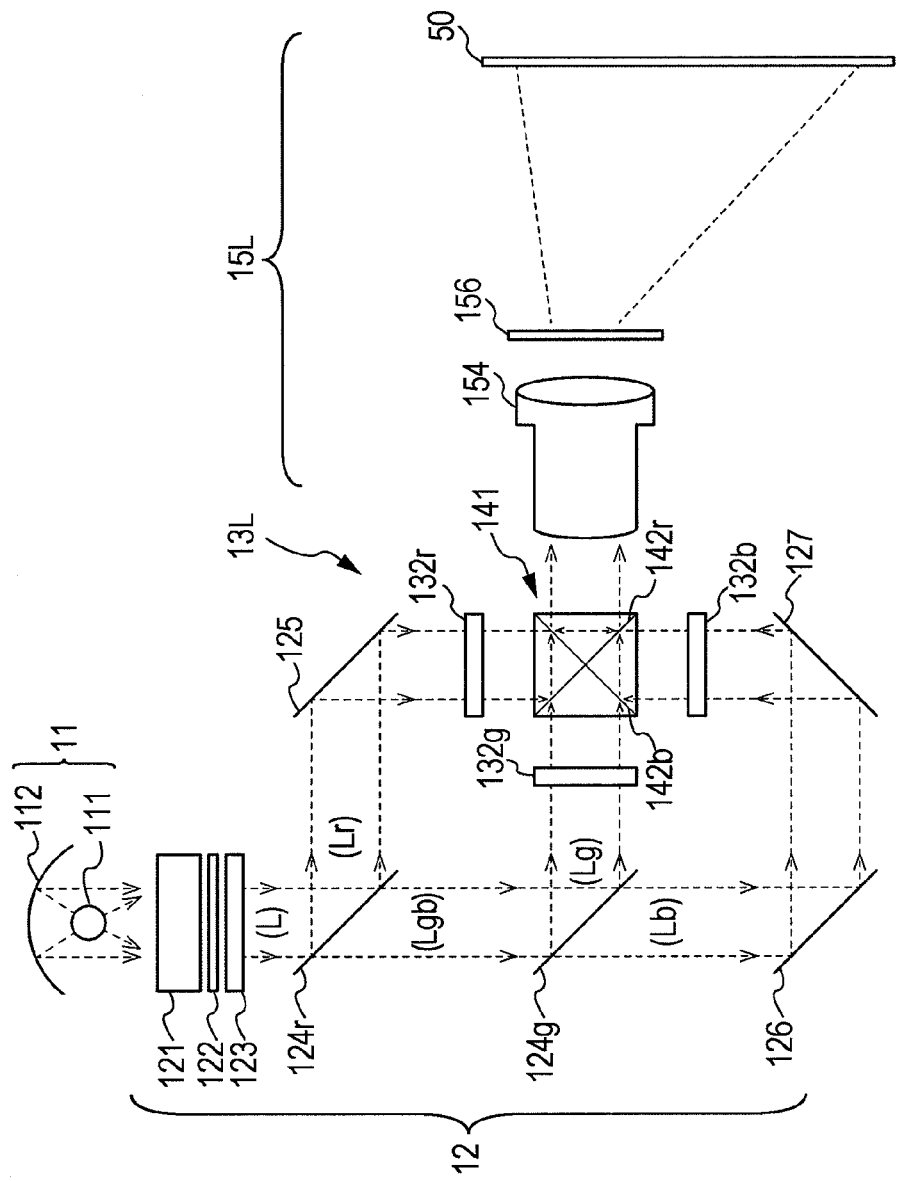
FIG. 10 shows a configuration of an optical system of the image display device displaying an image for the left eye.

FIG. 10 illustrates a configuration of an optical system of the image display device 10L displaying the image for the left eye. The optical system of the image display device 10L includes a light source 11, an illumination optical section 12, an image formation unit 13L, an image synthesizer 14 and a projecting section 15L. The light source 11, the illumination optical section 12 and the image synthesizer 14 have the same configurations as those of the foregoing image display device 10.

Liquid crystal panels 132r, 132g and 132b of the image formation unit 13L forms an image for the left eye on a display area without dividing the display area into areas for left and right eyes. The projecting section 15L includes a projection lens for the left eye 154 and a wavelength division filter for the left eye 156. The projection lens for the left eye 154 displays an image incoming from the image synthesizer 14 on the screen 50 and forms the image for the left eye. The wavelength division filter for the left eye 156 is disposed on, for example, the emission surface of the projection lens for the left eye 154 to divide the wavelength of the image for the left eye emitted from the projection lens for the left eye 154 and produces the image formed on the screen 50 as the image for the left eye of the predetermined wavelength component.

Although not shown, the image display device 10R displaying the image for the right eye forms the image for the right eye on the display area of the liquid crystal panel of the image forming section without dividing the display area into areas for left and right eyes. The projecting section displays an image incoming from the image synthesizer on the screen using the projection lens for the right eye to form the image for the right eye. The wavelength division filter for the right eye divides the wavelength of the image for the right eye emitted from the projection lens for the right eye and produces the image formed on the screen 50 as the image for the right eye of the predetermined wavelength component.

Figure 11:
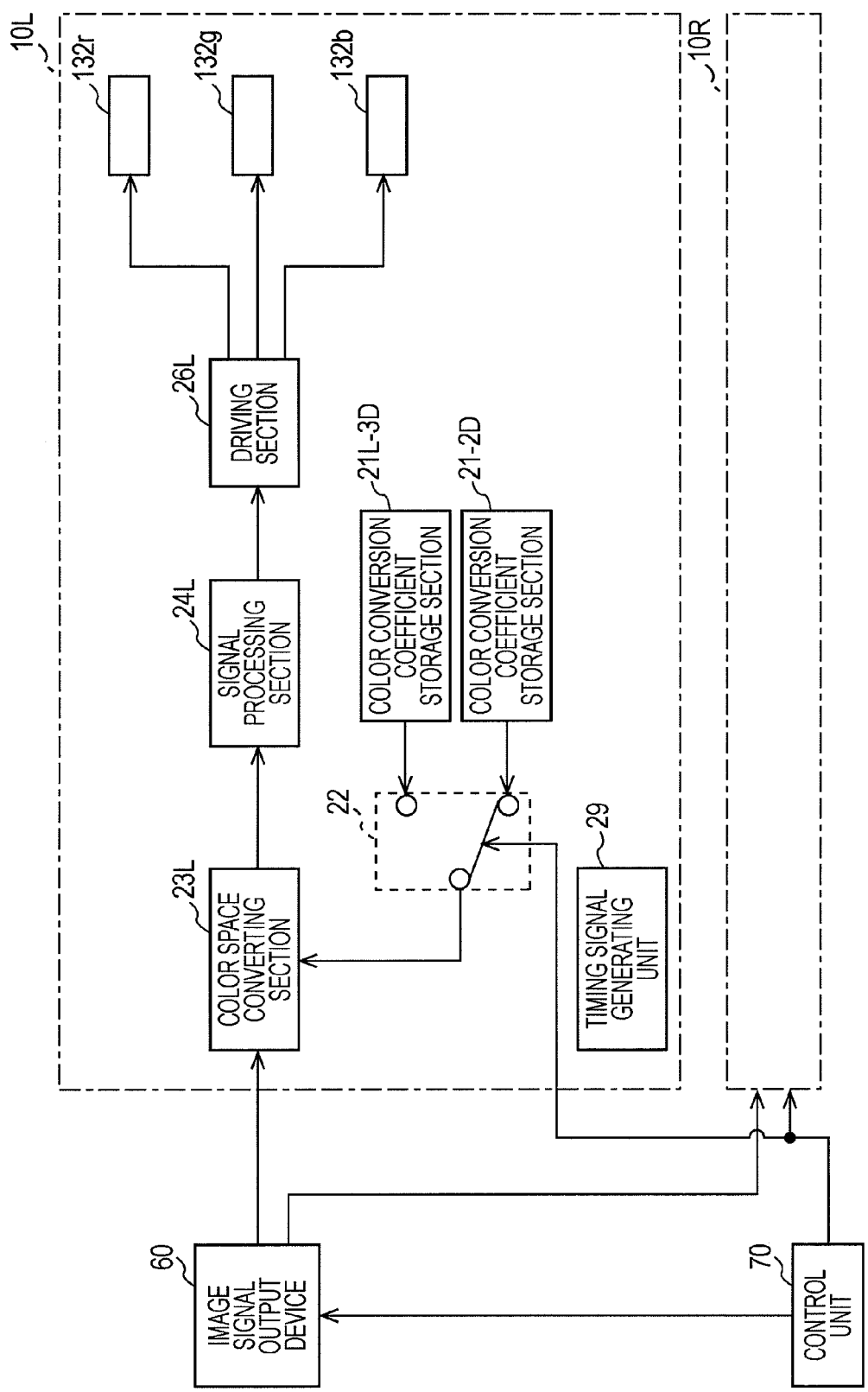
FIG. 11 is a block diagram showing a configuration of an electric system of the image display device displaying an image for the left eye.

FIG. 11 illustrates a configuration of the electric system of the image display device 10L which displays the image for the left eye. The image display device 10L includes a color conversion coefficient storage sections 21-2D and 21L-3D, a color conversion coefficient selecting section 22L, a converting section 23L, a signal processing section 24L, a driving section 26L and a timing signal generating section 29. The color conversion coefficient storage section 21-2D and 21L-3D, the converting section 23L and the signal processing section 24L have the same configurations as those of the foregoing image display device 10.

The color conversion coefficient selecting section 22L selects the color conversion coefficient storage section 21-2D when the identification signal from the control unit 70 indicates that the signal is an image signal representing the two-dimensional content. The color conversion coefficient selecting section 22L selects the color conversion coefficient storage section 21L-3D when the identification signal from the control unit 70 indicates that the signal is an image signal of the three-dimensional content. As described above, the color conversion coefficient which is determined so that the image to be displayed may have the desired color and brightness is stored in advance in the color conversion coefficient storage section 21-2D when the image of the two-dimensional content is to be displayed. The color conversion coefficient which is determined so that the image to be displayed may have the desired color and brightness is stored in advance in the color conversion coefficient storage section 21L-3D when the image for the left eye of the three-dimensional content is to be displayed.

The driving section 26L generates a driving signal for driving the liquid crystal panel 132r on the basis of the red image signal supplied from the signal processing section 24L and outputs the generated driving signal to the liquid crystal panel 132r. The driving section 25L generates a driving signal for driving the liquid crystal panel 132g on the basis of the green image signal supplied from the signal processing section 24L and outputs the generated driving signal to the liquid crystal panel 132g. The driving section 25L generates a driving signal for driving the liquid crystal panel 132b on the basis of the blue image signal supplied from the signal processing section 24L and outputs the generated driving signal to the liquid crystal panel 132b.

The liquid crystal panel 132r is driven by the red driving signal from the driving section 26L to generate a red component image of the image for the left eye to be displayed. The liquid crystal panel 132g is driven by the green driving signal from the driving section 26L to generate a green component image of the image for the left eye to be displayed. The liquid crystal panel 132b is driven by the blue driving signal from the driving section 26L to generate a blue component image of the image for the left eye to be displayed.

The image display device 10R which displays the image for the right eye has the same configuration as that of the image display device 10L which displays the image for the left eye. The color conversion coefficient selecting section of the image display device 10R selects the color conversion coefficient storage section 21-2D when the identification signal from the control unit 70 is the image signal representing the two-dimensional content. The color conversion coefficient selecting section selects the color conversion coefficient storage section which stores the color conversion coefficient equivalent to the foregoing color conversion coefficient storage section 21R-3D when the identification signal from the control unit 70 is the image signal of the three-dimensional content. The driving section drives the liquid crystal panel on the basis of the red image signal supplied from the signal processing section to generate the red component of the image to be displayed for the right eye. The driving section drives the liquid crystal panel on the basis of the green image signal supplied from the signal processing section to generate the green component of the image to be displayed for the right eye. The driving section drives the liquid crystal panel on the basis of the blue image signal supplied from the signal processing section to generate the blue component of the image to be displayed for the right eye.

In the thus-configured image display system, the color conversion coefficient for converting the color space in the image display devices 10L and 10R is switched depending on whether the image of the three-dimensional content or the image of the two-dimensional content is to be displayed. With this configuration, large variation in color and brightness between the image for the left eye of the three-dimensional content and the image for the right eye of the three-dimensional content upon displaying the stereoscopic image can be prevented. In addition, changes in color or brightness can be reduced as compared to the display of the plane image of the two-dimensional content.

In the foregoing description of the embodiment, the image of the three-dimensional content is displayed by using the wavelength division system. However, the invention is not limited to the display of the image of the two-dimensional content and the image of the three-dimensional content in the wavelength division system. For example, if the image of the three-dimensional content is to be displayed in other systems, such as a polarized light display system using a polarizing filter as the optical filter, the color and brightness of the image for the left eye and the image for the right eye may vary depending on the differences in the characteristic of the optical filter. An embodiment of the invention, however, may prevent variation in the color and brightness in the image for the left eye and the image for the right eye in the same manner as in the wavelength division system. In addition, changes in color or brightness can be reduced as compared to the display of the plane image of the two-dimensional content.

In the foregoing embodiment, the red image signal DSr, the green image signal DSg and the blue image signal DSb are converted into different color spaces to generate the red image signal DSrc, the green image signal DSgc and the blue image signal DSbc. However, the image signal used in the color space conversion is not limited to the trichromatic image signal. For example, the color space may be converted using a luminance signal and a color-difference signal to generate a trichromatic image signal. In this case, as in the case described above, the optimum color conversion coefficient is stored in advance in the color conversion coefficient storage section 21-2D, 21L-3D and 21R-3D and a color conversion coefficient is selected depending on whether the image of the two-dimensional content or the image of the three-dimensional content is to be displayed.

The present application contains subject matter related to that disclosed in Japanese Priority Patent Application JP 2008-294233 filed in the Japan Patent Office on Nov. 18, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image display device, comprising:
an image formation unit which forms an image for the left eye and an image for the right eye;
a projecting section which emits a light beam representing the image for the left eye via an optical filter for the left eye and a light beam representing the image for the right eye via an optical filter for the right eye having properties different from those of the optical filter for the left eye to display an image in a superimposed manner;
a first converting section which converts a signal representing an image for the left eye into an image signal of a different color space by using a first color conversion coefficient which is determined so that the image for the left eye displayed on the basis of the light beam passing through the optical filter for the left eye may have desired properties;
a second converting section which converts a signal representing an image for the right eye into an image signal of a different color space by using a second color conversion coefficient which is determined so that the image for the right eye displayed on the basis of the light beam passing through the optical filter for the right eye may have desired properties; and
a driving section which drives the image formation unit on the basis of the converted signal representing the image of the left eye and the converted signal representing the image of the right eye to form the image for the left eye and the image for the right eye.

2. An image display device according to claim 1, further comprising:
a color conversion coefficient selecting section which makes a selection from among the first color conversion coefficient, the second color conversion coefficient and a third color conversion coefficient, the third color conversion coefficient being determined so that a plane image displayed on the basis of a light beam emitted via the optical filter for the left eye and the optical filter for the right eye may have desired properties;
the color conversion coefficient selecting section selects the first color conversion coefficient and the second color conversion coefficient when a stereoscopic image is to be displayed and selects the third color conversion coefficient when a plane image is to be displayed;
the first converting section converts the signal representing the image of the left eye to an image signal of different color space using the first color conversion coefficient if the first color conversion coefficient is selected by the color conversion coefficient selecting section and converts the image signal representing the plane image into an image signal of a different color space using the third color conversion coefficient if the third color conversion coefficient is selected by the color conversion coefficient selecting section;
the second converting section converts the signal representing the image of the right eye in to an image signal of a different color space using the second color conversion coefficient if the second color conversion coefficient is selected by the color conversion coefficient selecting section and converts the image signal representing the plane image into an image signal of a different color space using the third color conversion coefficient if the third color conversion coefficient is selected by the color conversion coefficient selecting section;
the driving section drives the image formation unit on the basis of the converted image signal obtained by the first converting section and the converted image signal obtained by the second converting section to form the image for the left eye, the image for the right eye, or the plane image; and
the projecting section emits a light beam representing the image for the left eye via the optical filter for the left eye, emits a light beam representing the image for the right eye via the optical filter for the right eye, and emits a light beam of the plane image via the optical filter for the left eye and the optical filter for the right eye.

3. An image display device according to claim 1, wherein the first converting section and/or the second converting section changes the first color conversion coefficient and/or the second color conversion coefficient at a constant rate so that the image for the left eye on the basis of the light beam emitted via the optical filter for the left eye and the image for the right eye on the basis of the light beam emitted via the optical filter for the right eye have an equivalent brightness.

4. An image display device according to claim 1, wherein the optical filter for the left eye and the optical filter for the right eye are wavelength division filters through which light beams of different wavelengths are to be passed.

5. A method of displaying an image, comprising the steps of:
forming an image for the left eye and an image for the right eye by using an image formation unit;
emitting a light beam representing the image for the left eye via an optical filter for the left eye and a light beam representing the image for the right eye via an optical filter for the right eye having properties different from those of the optical filter for the left eye to display an image in a superimposed manner by using a projecting section;
converting a signal representing an image for the left eye into an image signal of a different color space by using a first color conversion coefficient which is determined so that the image for the left eye displayed on the basis of the light beam passing through the optical filter for the left eye may have desired properties by using a first converting section;
converting a signal representing an image for the right eye into an image signal of a different color space by using a first color conversion coefficient which is determined so that the image for the right eye displayed on the basis of the light beam passing through the optical filter for the left eye may have desired properties by using a second converting section; and
driving the image formation unit on the basis of the converted signal representing the image of the left eye and the converted signal representing the image of the right eye to form the image for the left eye and the image for the right eye by using a driving section.

6. An image display system comprising:
a device displaying an image for the left eye which includes an image formation unit for forming an image for the left eye and a projecting section which emits a light beam representing the image for the left eye via an optical filter for the left eye; and
a device displaying an image for the right eye which includes an image formation unit forming an image for the right eye and a projecting section which emits a light beam representing the image for the right eye via an optical filter for the right eye,
wherein:
the device displaying an image for the left eye includes a first converting section which converts a signal representing an image for the left eye into an image signal of a different color space by using a first color conversion coefficient which is determined so that the image for the left eye displayed on the basis of the light beam passing through the optical filter for the left eye may have desired properties, and a driving section which drives the image formation unit on the basis of the converted signal representing the image of the left eye to form the image for the left eye; and the device displaying an image for the right eye includes a second converting section which converts a signal representing an image for the right eye into an image signal of a different color space by using a first color conversion coefficient which is determined so that the image for the right eye displayed on the basis of the light beam passing through the optical filter for the left eye may have desired properties, and a driving section which drives the image formation unit on the basis of the converted signal representing the image of the right eye to form the image for the right eye.

* * * * *